United States Patent
Grasser et al.

(10) Patent No.: US 7,681,138 B2
(45) Date of Patent: Mar. 16, 2010

(54) USE OF A REUSABLE CONTROL SOFTWARE WHOSE USER INTERFACE AND COMMUNICATION CONNECTION ARE ESTABLISHED VIA AN EXTERNAL DESCRIPTION-BASED CONFIGURATION AT RUN TIME

(75) Inventors: Frank Grasser, Eggolsheim (DE); Sigmar Hopf, Ebensfeld (DE); Winfried Lurz, Fürth (DE); Peter Schmittinger, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 286 days.

(21) Appl. No.: 11/485,520

(22) Filed: Jul. 11, 2006

(65) Prior Publication Data
US 2008/0016466 A1    Jan. 17, 2008

(51) Int. Cl.
*G06F 3/048* (2006.01)
(52) U.S. Cl. ................. 715/763; 715/762; 715/764; 715/835
(58) Field of Classification Search ........... 715/763, 715/762, 835, 764
See application file for complete search history.

(56) References Cited

U.S. PATENT DOCUMENTS

| | | | |
|---|---|---|---|
| 6,476,828 B1 * | 11/2002 | Burkett et al. | 715/760 |
| 6,550,019 B1 * | 4/2003 | Ahrens et al. | 714/10 |
| 6,934,356 B1 * | 8/2005 | Satheesan et al. | 378/62 |
| 6,990,654 B2 * | 1/2006 | Carroll, Jr. | 717/109 |
| 6,996,771 B1 * | 2/2006 | O'Brien | 715/207 |
| 2002/0089542 A1 * | 7/2002 | Imamura | 345/764 |
| 2003/0014440 A1 * | 1/2003 | Bussert et al. | 707/513 |
| 2003/0025693 A1 * | 2/2003 | Haley | 345/418 |
| 2003/0043192 A1 * | 3/2003 | Bouleau | 345/762 |
| 2003/0172344 A1 * | 9/2003 | Dencker et al. | 715/500 |
| 2003/0184585 A1 * | 10/2003 | Lin et al. | 345/763 |
| 2003/0231204 A1 * | 12/2003 | Hanggie et al. | 345/744 |
| 2004/0010500 A1 * | 1/2004 | Madduri et al. | 707/100 |
| 2004/0015783 A1 * | 1/2004 | Lennon et al. | 715/523 |
| 2004/0158820 A1 * | 8/2004 | Moore et al. | 717/136 |
| 2005/0177812 A1 * | 8/2005 | Andrew et al. | 717/100 |
| 2006/0277498 A1 * | 12/2006 | Mann et al. | 715/825 |

* cited by examiner

*Primary Examiner*—Weilun Lo
*Assistant Examiner*—Tuyetlien T Tran
(74) *Attorney, Agent, or Firm*—Schiff Hardin LLP (57) ABSTRACT

A system and appertaining method provide a user interface application whose design is optimally modular and can be simply serviced and expanded on, and offers and optimally "free" configuration in order to cover all types of system conditions. A GUI file comprising description of graphical elements and appertaining identifiers is used to permit field changes by non-software developers without rebuilding any software. A similar communications file comprising communications parameters is provided that permits linkage to the GUI file by utilizing identifiers in common with those of the graphical elements in the GUI file.

18 Claims, 10 Drawing Sheets

GUI.xml 100

```
<MainWnd guiid="1000" R="0" G="0" B="0">
122 ──  <widget type="button">
        <widgetid>1</widgetid>
124     <pos_x>30</pos_x>
        <pos_y>80</pos_y>
        <width>100</width>
        <height>50</height>
        <display_states>
        <bmp_disabled>101</bmp_disabled>
          <bmp_enabled_off>105</bmp_enabled_off>
          <bmp_enabled_on>104</bmp_enabled_on>
          <bmp_pressed_off>102</bmp_pressed_off>
          <bmp_pressed_on>103</bmp_pressed_on>
        </display_states>
        <label type="text">
        <resourceid>200</resourceid>  // Icon resource
        <def_value>Native</def_value>
        </label>
        <tooltip>
        <resourceid>201</resourceid>  // String resource
        <def_value>This is a tooltip</def_value>
        </tooltip>
        <default_displaystate>105</default_displaystate>
126 ── <dataid>0001</dataid> // Unique data ID
        </widget>
        ...

</MainWnd>
```

FIG. 3B

COM.xml 200

```xml
<com>
  <!-- RECEIVE BLOCK -->
  <comobj id="1232">          202
    <param name="PARAM_A">          214
      <offset/>
      <type/>
      <min_val/>
      <max_val/>
      <dataid>0001</dataid>          204
    </param>
    <param name="PARAM_B">          214'
      <offset/>
      <type/>
      <min_val/>
      <max_val/>
      <dataid>0002</dataid>          204'
    </param>
  </comobj>
  <!-- SEND BLOCK -->
  <dataid value="0001">          204
    <sendobj id="2401">          203
      <param name="FUNCTION_ID">
        <value>1815</value>
      </param>
      <param name="TRANSFER_PARAM">
        <value>0</value>
      </param>
      <param name="TRANSFER_STATE">
        <select>1</select>
        <deselect>0</deselect>
      </param>
    </sendobj>
  </dataid>
</com>
```

USE OF A REUSABLE CONTROL SOFTWARE WHOSE USER INTERFACE AND COMMUNICATION CONNECTION ARE ESTABLISHED VIA AN EXTERNAL DESCRIPTION-BASED CONFIGURATION AT RUN TIME

BACKGROUND

Both the reusability and the universal usability of a software product are an important principle in the development of applications. A corresponding software architecture offers the possibility to use and to extend operating software for the most varied system types with no additional or only slight development effort. Both the control mechanisms and the "look and feel" are unified for multiple product families.

User interface applications, particularly in the medical imaging apparatus field, have previously frequently been specifically and separately developed for multiple medical systems. The functionality that is implemented in such systems is conditional upon the system and thus, on the one hand, is more or less complex and, on the other hand, have control philosophies that inherently differ. In the field of medical imaging devices, the product palette reaches from a simple fluoroscopy machine up to a high end angio system.

SUMMARY

The present invention provides a user interface application whose design, on the one hand, is optimally modular and can be simply serviced and expanded on, and, on the other hand, offers an optimally "free" configuration in order to cover all types of system conditions.

Accordingly, a method is provided for operating, by a user, a system having a communications interface and user interface, comprising: reading, at run time, a graphical user interface (GUI) data file comprising descriptions of graphical elements and a data identifier associated with the graphical element; dynamically generating and displaying graphical elements on the user interface based on the associated descriptions from the GUI data file; reading, at run time, a communications data file comprising descriptions of communications parameters in the communications data file to create dynamically generated communications parameters and a data identifier having the same value as the data identifier associated with the graphical element; associating the graphical element with one or more communications parameters based on the common value of the related GUI data file data identifier and the communications data file data identifier; and utilizing the communications parameter associated with the graphical element to either send data associated with a user interaction of the graphical element, or to effect a change in the graphical element based on received data.

Although it is possible to provide an editor for the data files for use in the field, in a preferred embodiment, the end users themselves should generally not be able to create their own interface without any support.

Furthermore, a system is provided for allowing a user to interact with an application, comprising: a storage system comprising: a GUI data file comprising descriptions of graphical elements and a data identifier associated with the graphical element; and a communications data file comprising descriptions of communications parameters in the communications data file to create dynamically generated communications parameters and a data identifier having the same value as the data identifier associated with the graphical element; the system further comprising: a user interface comprising a display upon which graphical elements are presented by a software routine that relate to the graphical elements read from the GUI data file; and a communications system comprising: an output at which information can be transmitted in accordance with the communications parameter that is related to the graphical element via the data identifier; and an input to which information can be transmitted in accordance with the communication parameter that is related to the graphical element via the data identifier.

According to various embodiments of the invention, the modular design should primarily be realized via the consequent separation of the display, the display data, and the communication layer. A display element understands how to operate on and work with display data, but the communication layer does not know how to operate on and work with such display data. The communication layer likewise understands how to work with communications data, but not display data associated with the display elements.

All information regarding the design of the user interface, the data layer, and the communication layer can be read from a "freely" editable external data storage location or from a file—the well-known XML data format, for example, may be utilized for this. Of significance is the fact that these parameters may be changed or extended by one or more of the supported elements entirely at run time, without requiring a rebuild of the software for a change, and that the use of a common identifier serves to link the entities from different layers together.

In one embodiment, a change in the parameters would require a restart of the application, to ensure a synchronization of the related parameters amongst the applications and threads utilizing them, although in another embodiment, it may be possible to utilize some form of a synchronizing event after such a change is made.

In the creation of this data, both the individual display elements and corresponding data and communication parameter sets are thus dynamically generated (at run time) from a description-based configuration (e.g., stored in XML format). Using (exchangeable) libraries integrated into the software, all required graphical element types can be provided in the design in a specific and operating system (OS)-independent manner. The user interface can thus build "itself" on the fly.

As discussed below in more detail, in the preferred embodiment, the system architecture contains one module (the main application executable module <<EXE>>) that is distinguished from other libraries in that it is OS dependent. This is the module that would handle drawing mechanisms, task threading, etc. that are OS dependent, especially for the Windows OS. Such a module would have to be rewritten for another OS, such as UNIX, etc. Advantageously, the other packages do not use OS dependent calls, and thus could be easily reused on an embodiment having a different platform.

The advantage to this approach is that there are only still system-specific description configurations that can be read and processed via a uniform software. At runtime, the running application thus possesses only elements that are actually required specific to the system. Via the complete accommodation of all necessary information of the graphic elements of an application into a structured description, each control element of the display can be generated as needed via data up to the point of communication.

In most cases, the software can thus also be expanded via a communication connection inclusive of the particular standard control elements (window, tab card, button, image display, checkbox, etc.) without software having to be changed for this purpose.

Outside of or after the system software development cycle (i.e., when the software can actually be compiled and linked), there are often teams which examine and determine the operability of the systems directly at and together with the customers (i.e., without having tools present for making changes to the actual software). In the older systems, change and system evaluation and assessment could previously only ensue via a prototype development.

According to present inventive embodiments and without requiring an know-how for software development (how to write, compile, and link code), such teams would be in the position to adapt and to evaluate the user interface using the description configuration, and to test and optimize the clinical workflow on site at the customer's location. The future expansion effort of an operation would be significantly minimized and thus also more cost-effective on the part of the development. The customer profits along the way from uniform control mechanisms and common "look and feel" standards for various system types.

Accordingly, with this architecture, the software can be reused for any user interface application, which is using exclusively the supported graphical elements. For example, in order to add a software button to an application, the description files would simply be extended (using, e.g., a simple text or XML editor, or tools designed for this purpose) and the system would thus add a new button during the software startup phase, which also has the needed communication interface to the system. Even new windows, popups, tabs/tabcards, and any other form of user interface element can be specified solely by extending the description files without having to compile or link any code.

Because of this modular architecture, the application can, e.g., be portable and used on another machine with another OS installed just by rewriting the specific routine that maintains all OS relevant implementations (i.e., the complete OS package would have to be rewritten in this case).

DESCRIPTION OF THE DRAWING

The invention is described in more detail below with respect to a preferred embodiment of the invention and the associated drawing figures.

DETAILED DESCRIPTION OF THE PREFERRED EMBODIMENTS

The following describes a preferred embodiment of the invention. As illustrated in the FIG. 1A overview, the software can be divided into three physical layers: 1) a Graphical User Interface (GUI) Layer (or "Front-End") 20 (with three different displays 70, 70a, 70b illustrated), 2) a Communication Applications Layer (or "Back-End") 40, and between those layers, and 3) the Data Layer 30, which holds a specific data set class (including state, properties, value, etc.) associated with each graphical element of a display. This makes it possible to run the Front-End user interface layer 20 and Back-End communications applications layer 30 without these entities requiring a specific and dedicated interface or understanding and implementing details associated with the other. The only interface is the Data Layer 30.

Figure 1A:
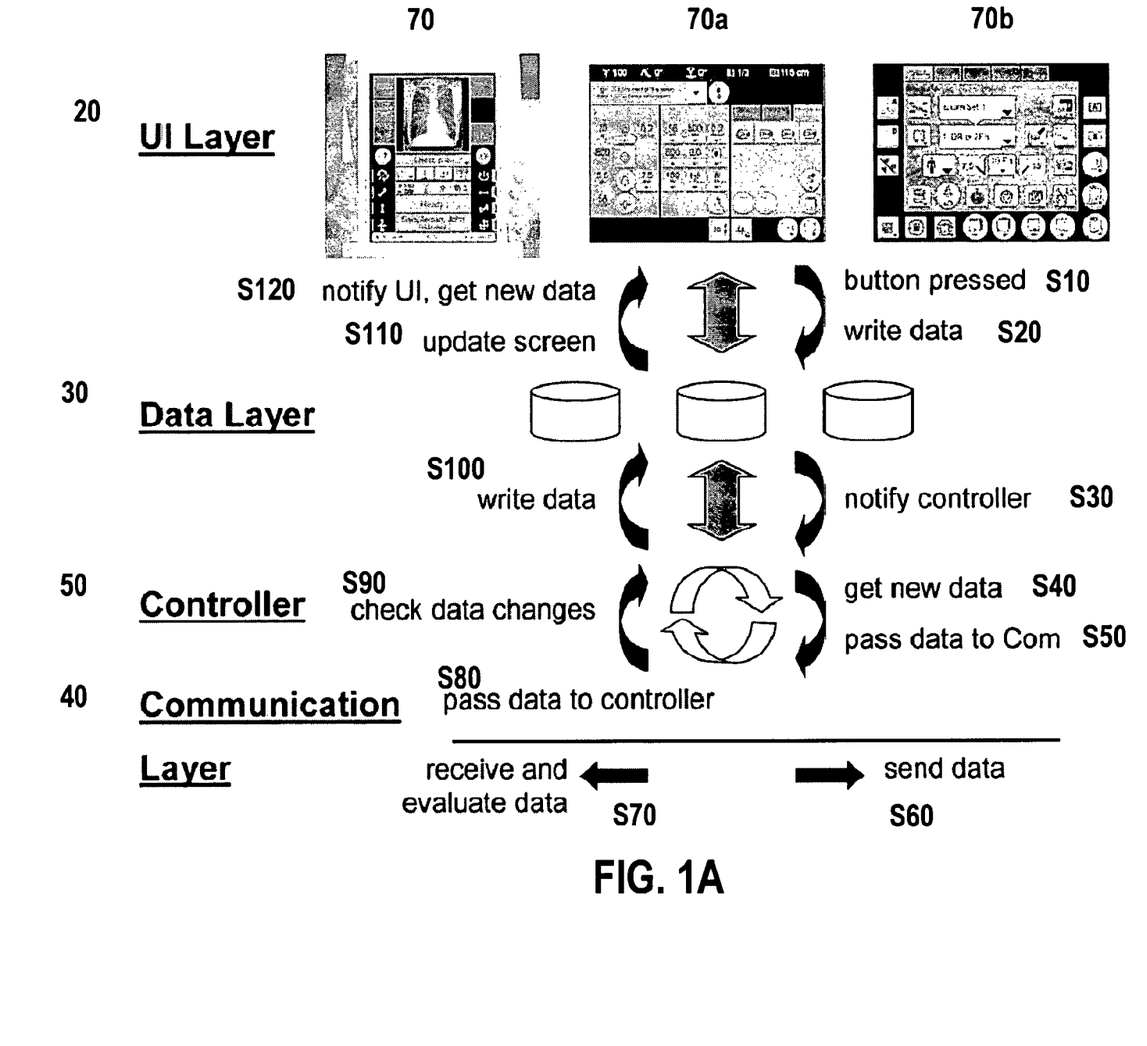
FIG. 1A is a high-level structure diagram illustrating the entities and steps involved at various architectural layers in the system.
Figure 1B:
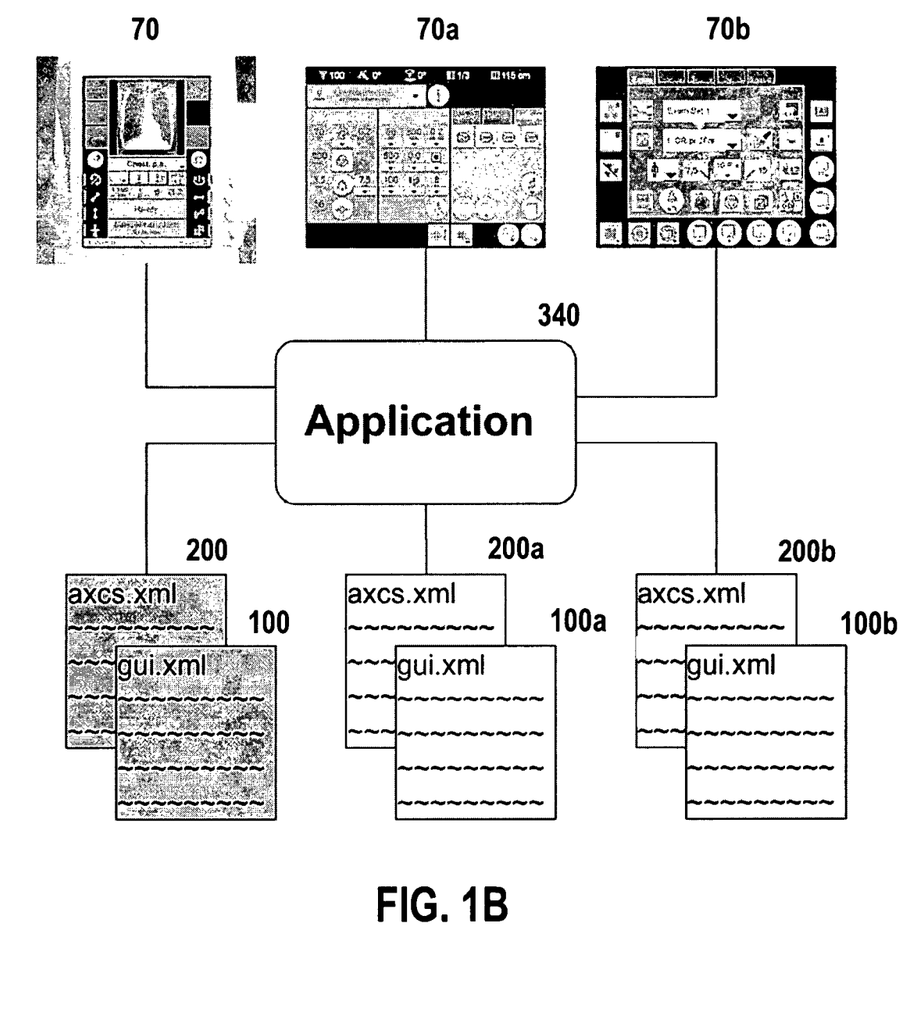
FIG. 1B is a high-level block pictorial diagram illustrating the relationship between the display, the application, and the configuration files.

Following an exemplary procedure provided in FIG. 1A, a user presses a button S10 in the GUI Layer 20. The data is written to a storage location S20 in the Data Layer 30, after which the controller 50 is notified S30. The controller 50 gets the new data S40 and passes this data on to the Communication Layer 40 at S50. Data related to the button press is then sent to some other entity S60. The Communication Layer 40 further receives and evaluates the data S70 and passes the received data on to the controller 50 at S80. The controller 50 then checks to see if there have been any changes S90 and writes the data S100 to the storage location within the Data Layer 30. In S110, the screen is updated and the GUI layer is notified S120, which then gets the new data and indicates a screen update.

As provided in this embodiment, the architecture of this software is based on the usage of description files, which may be implemented as eXtensible Markup Language (XML) files (FIG. 1B 100, 200, 100a, 200a, 100b, 200b; generically 100, 200 hereafter), although any type of structured data file that is capable of being edited can be utilized. These files, gui.xml 100 and axcs.xml (alternately, com.xml) 200, indicate the layout and the look and feel of the graphical user interface 70 on the one hand and the Communication Layer 40 on the other hand.

Figure 3A:
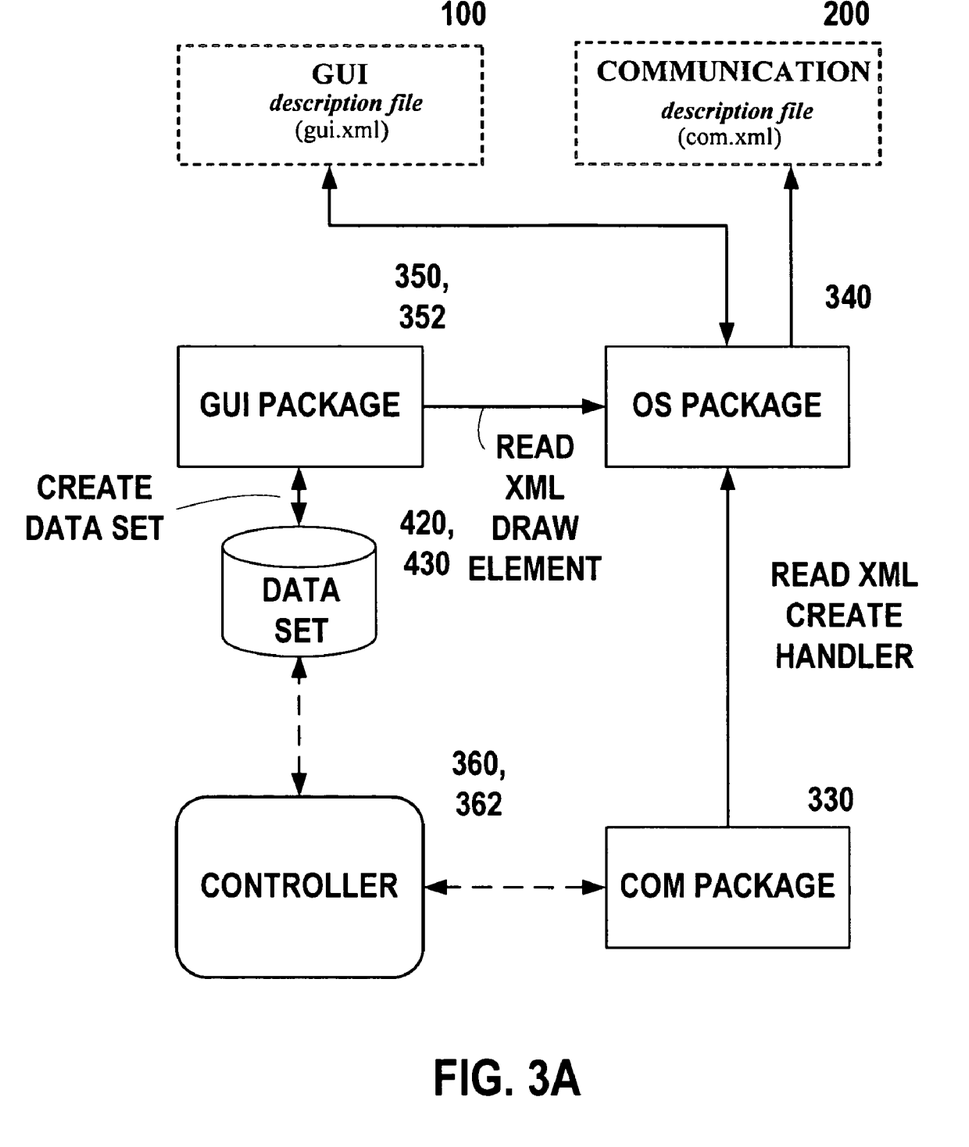
FIG. 3A is a block diagram providing a different view of the system from that shown in FIGS. 2A, 2B, and illustrates an exemplary XML implementation.

Every data set for a specific graphical element has a unique Data Set ID, which is used as identifier in both description files so that a proper linking together or association can be performed. FIG. 3A illustrates how the gui.xml file 100 comprises a data id having a value of 1 (126) and respectively the com.xml file 200 includes the data id having a value of 1 (204) and an associated parameter (here "a") and its type here ("UINT" for unsigned integer).

Figure 2A:
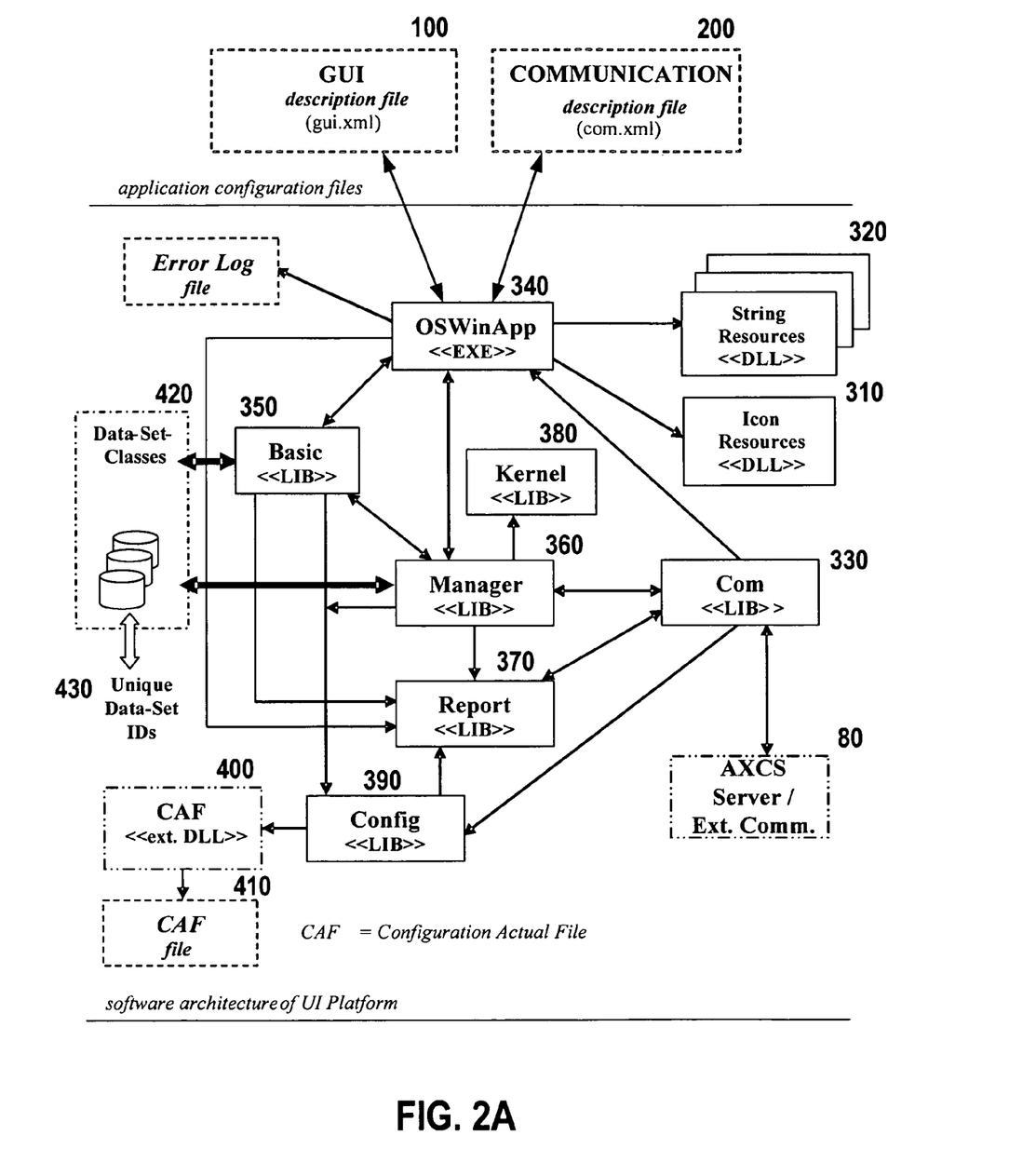
FIG. 2A is a block diagram illustrating the various modules present on the system.
Figure 2B:
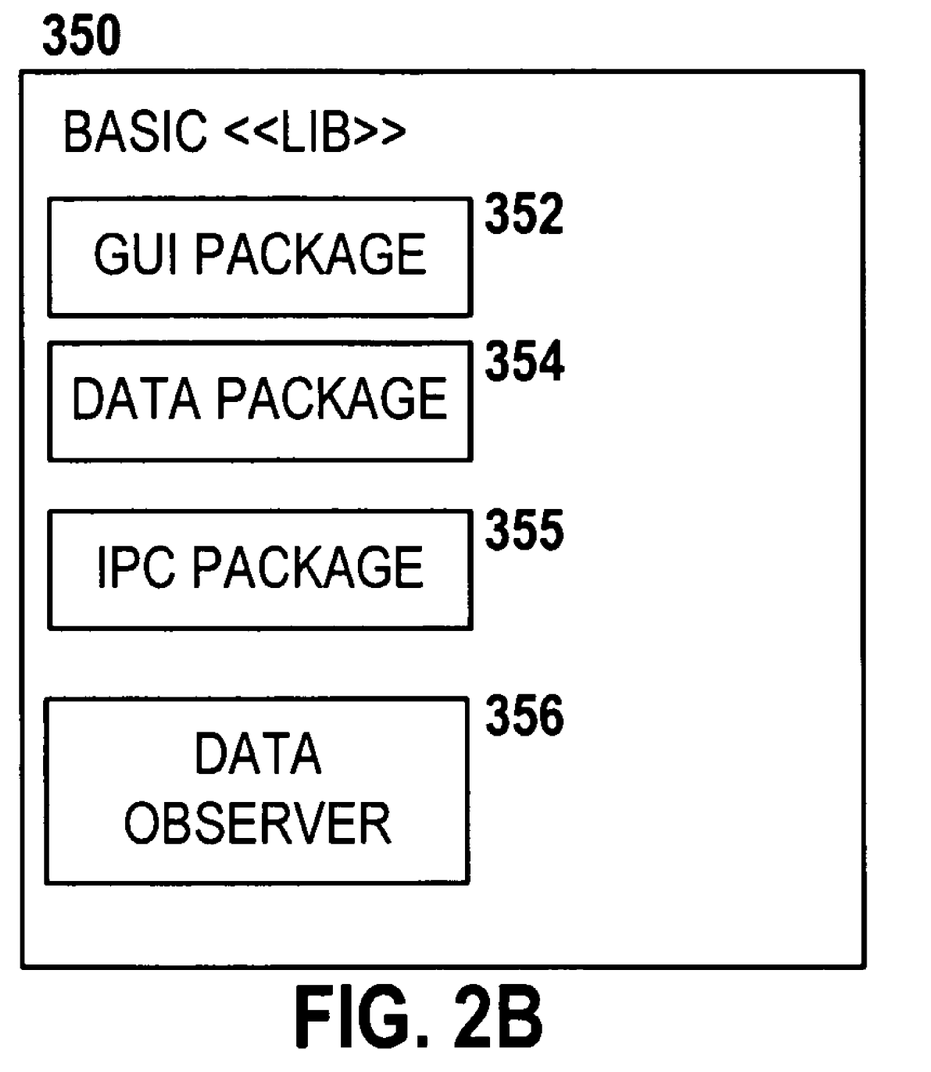
FIG. 2B is an expansion of the basic library block from FIG. 2A.

The software itself is split into a main application part 340 (see FIG. 1B), which may be developed for a specific OS, e.g., Windows CE 5.0 and Windows XP, UNIX, or any other common OS), and different functional libraries (see FIGS. 2A, B), which are implemented in an OS-independent manner.

Using known object oriented programming techniques, the single software packages all have a facade class for Inter-Package-Communication (IPC). Any interface class is known to an IPC Manager, so each package could easily access another one by querying the interface of the other package from the manager to access the corresponding package. The access to a package always runs through the facade class, this is the one and only incoming interface of a package. The manager for querying another package can be accessed from any place of the source code where it is known.

Thus, advantageously, the use of description files 100, 200 for scaling a user interface application with the use of unique data IDs 126, 204 make it possible address the Front-End User Interface 20 as well as the Back-End Communications 40 of an application just by the use of an easily modifiable description in a data file 100, 200.

The GUI Layer 20 involves a main application 340 and a GUI Package (implemented in the Basic Library 350). The main application (or OS) Package (OSWinApp) 340 implements all OS-dependent issues, like drawing, threading, mutex, XML-Reading, etc. Whenever an OS-dependent functionality is used, the specific call is passed to OSWinApp 340. The OS Package holds, among other things, the OS dependent interface calls for XML reading and graphical operations.

The GUI package 350 is responsible for reading the description file 100 of the GUI layout, using the specific OS dependent interface for reading XML files and creates a controller 362, the data set 430, and the specific element itself. The unique data set IDs 430 can be creates as instances of the data set classes 420. Referring to FIGS. 4A-C, for each available window 70, 70a, 70b or graphical element 72-80 (initially, the software can be prepared for windows, popups, tabcards, buttons, text fields, static icons, listboxes, radio groups, and check boxes or any other known UI elements—see FIG. 3B), the specific information related to the graphical element 72-80 is read, the appertaining data set is created, a special controller (handler) class for the element is created and registered 420, 430 (FIG. 2A) to the data observer (356, FIG. 2B), and finally, the element 72-80 is drawn on the display window 70. If everything is up and running, the previously stored description data can be released.

As shown in FIG. 2B, the Data Layer 30, comprises a Data Package 354, a Data Observer 356, and an Interprocess Communication (IPC) Package 355 (which serves to regulate the Inter Package Communication of the software) which are a part of the Basic Library 350. The Data Package 354 stores all data set classes in a storage area 420. For each supported graphical element type, a specific data set pattern is available. The Data Observer 356 is the design pattern (GoF) oriented internal "information system" for changed data. (It should be noted that the GoF oriented material refers to materials related ot object-oriented programming developed and published by Erich Gamma, Richard Helm, Ralph Johnson, John Vlissides, ("Gang of Four") such as that in Design Patterns: Elements of Reusable Object-Oriented Software (Addison-Wesley Professional Computing Series, 1$^{st}$ Ed. 1995), herein incorporated by reference).

If an object (handler) is registered for a specific data set of a control element, it is notified if the data set was changed for querying the new data.

The Controlling Layer 50 comprises a Manager 360 and a Communications Library (Package) 330. The COM Package 330 reads the description for the COM, using the specific OS dependent interface for reading XML files, and creates a handler for interacting with the data set. (Controlled by the Controller.) The Manager 360 is a key element of this architecture. It represents the interface between the communication layer 40 and the data sets 420. Even if the GUI 70 changes a data set 420 (e.g., a button 72 is pressed, the Manager 360 gets informed about the input, passes the selection to the system network through the communications routines 330, and evaluates the system response), the Manager 360 decides whether the state of the button 72 is changed from "normal" to "pressed". The Manager 360 further implements most of the internal state machines and manages internal and also system states. In general, the Manager 360 also evaluates and manages any incoming data from the communication layer 40 and appertaining library package 330 functions.

The Communications Library 330 implements an interface to a specific communication mechanism 332 and is in general responsible for receiving and sending data to the system network.

Here, initially the communication description file 200 is read and interpreted. The read data includes all needed information about the object to be sent S60 due to an internal action or what to do if any data was received S70.

Therefore, also accordingly, handlers are created due to the description file 200. The mapping is done by the specific unique data ID 126, 204. So, it is always known what to (send) on an internal state change as well as on an external state change. Finally, if again is everything is up and running on this Communication Layer 40, the read description data can be released.

Various services in the system can be implemented in libraries. These could include a Kernel Management Library 380, an Error Reporting Library 440, and a Configuration Library 390.

The Kernel Management Library 380 implements all kernel-relevant calls and provides kernel services according to the OS platform used.

A special error reporting mechanism may be provided that formats internal error messages according to a system dependent style and saves error information into an error log file 440.

A Configuration Library 390 may further be provided. This is an adapter package to a global configuration mechanism of the system, and provides internal operations for querying general configuration data which is a configuration mechanism that makes it possible to transfer the system configuration to the device and for performing general settings (it is unrelated to the scaling and other aspects related to integration with the GUI). This configuration provides data like language settings, volume settings, system type or special system component information, etc., i.e., all aspects of the system which are not responsible for setting up the graphical layout and communication behavior of the software.

Additionally, various system resources may be implemented, e.g., as Dynamic Link Libraries (DLLs), which can include String Resources and Icon or Graphical Entity Resources. String Resource DLLs 320 may be provided to facilitate localization, i.e., to provide access to similar strings in various languages that may be implemented. The Icon (or other Graphical Entity) Resource DLLS 310 may be utilized to store graphical resources that are utilized, such as static icons, button icons, etc. The string resources 320 may be created once in a default language (e.g., English) and are then translated to all other languages needed, each into a separate DLL for each language. The icon/bitmap resources 310 store all icons and graphics, displayed on the device.

Figure 3B:
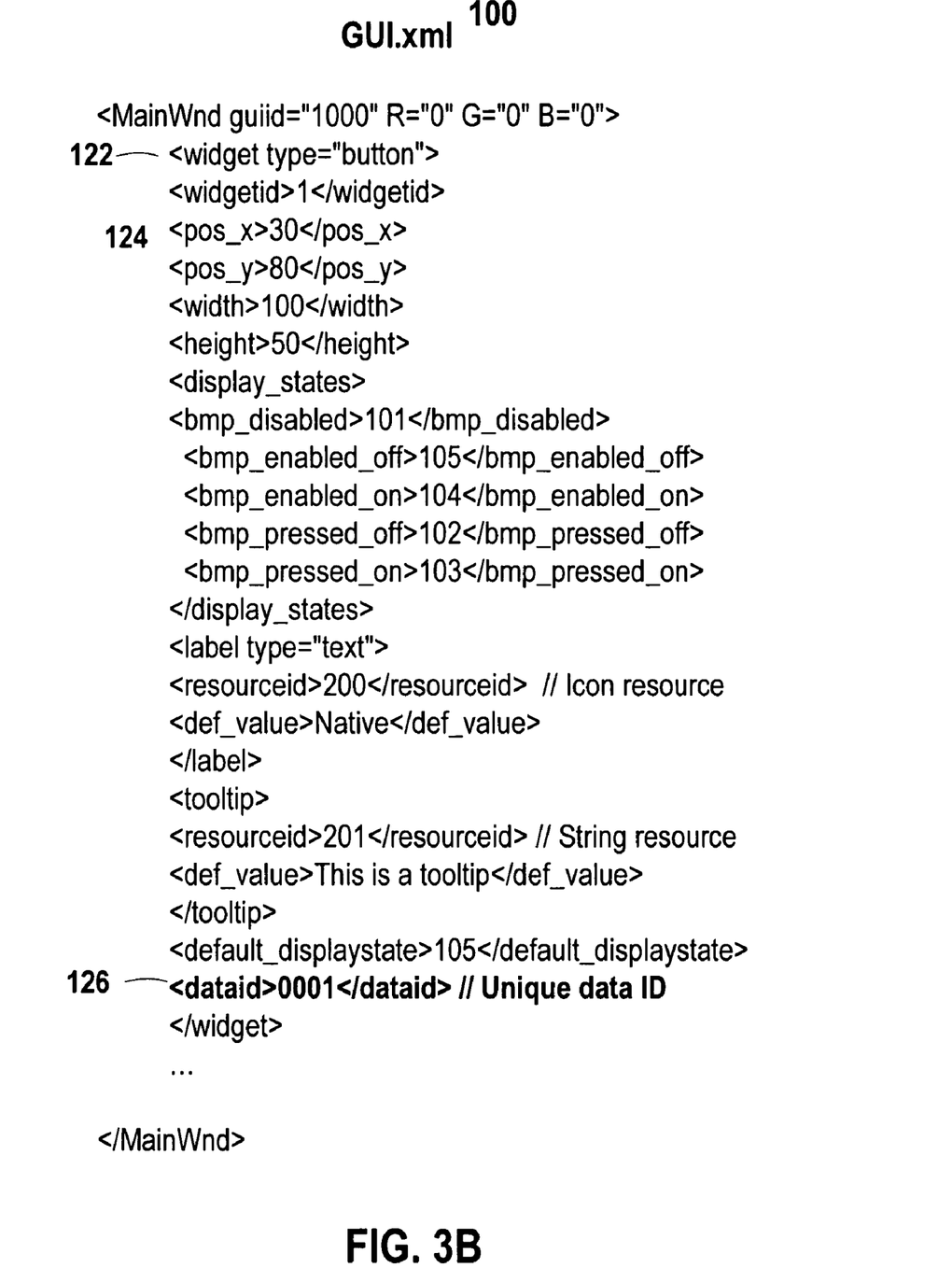
FIG. 3B is a further illustration of an XML listing for the GUI file.
Figure 3C:
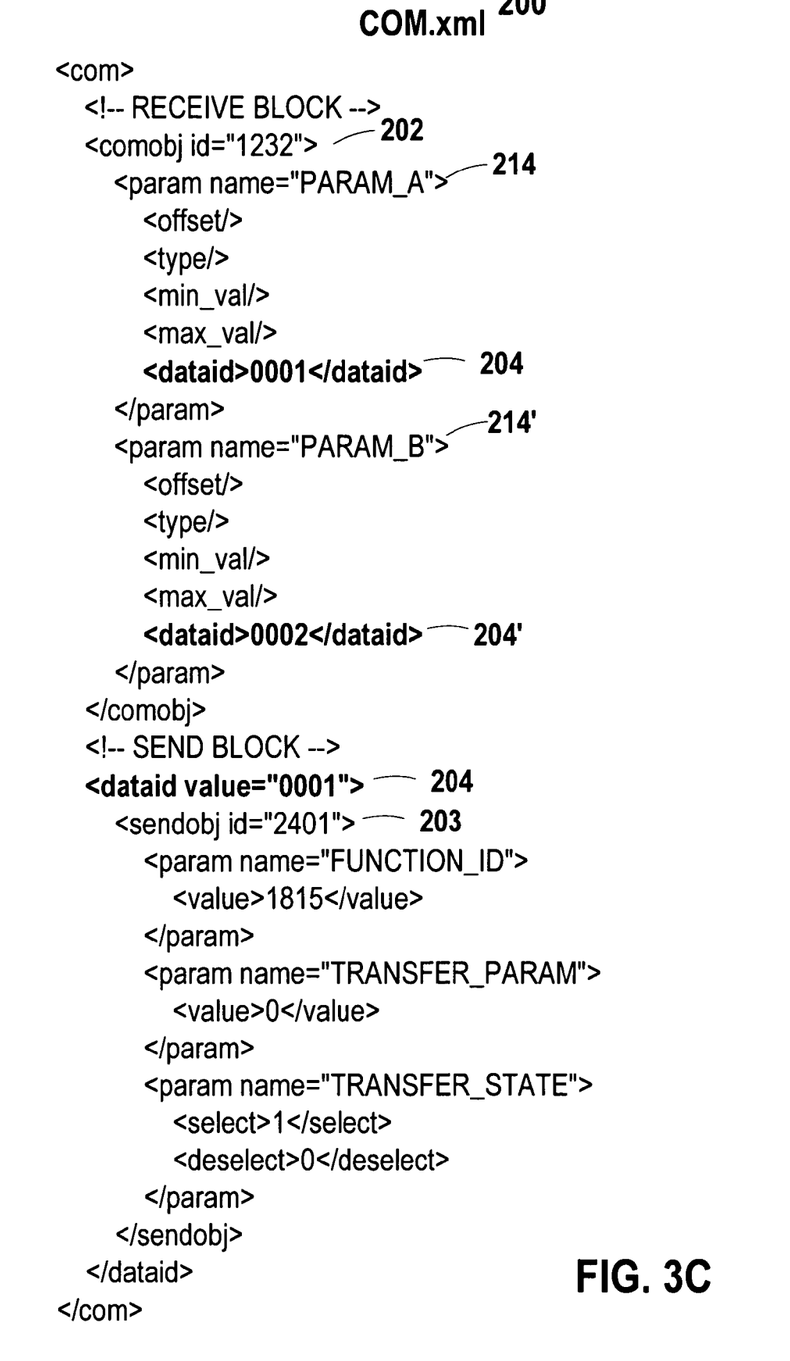
FIG. 3C is a further illustration of an XML listing for the communications file.
Figure 4A:
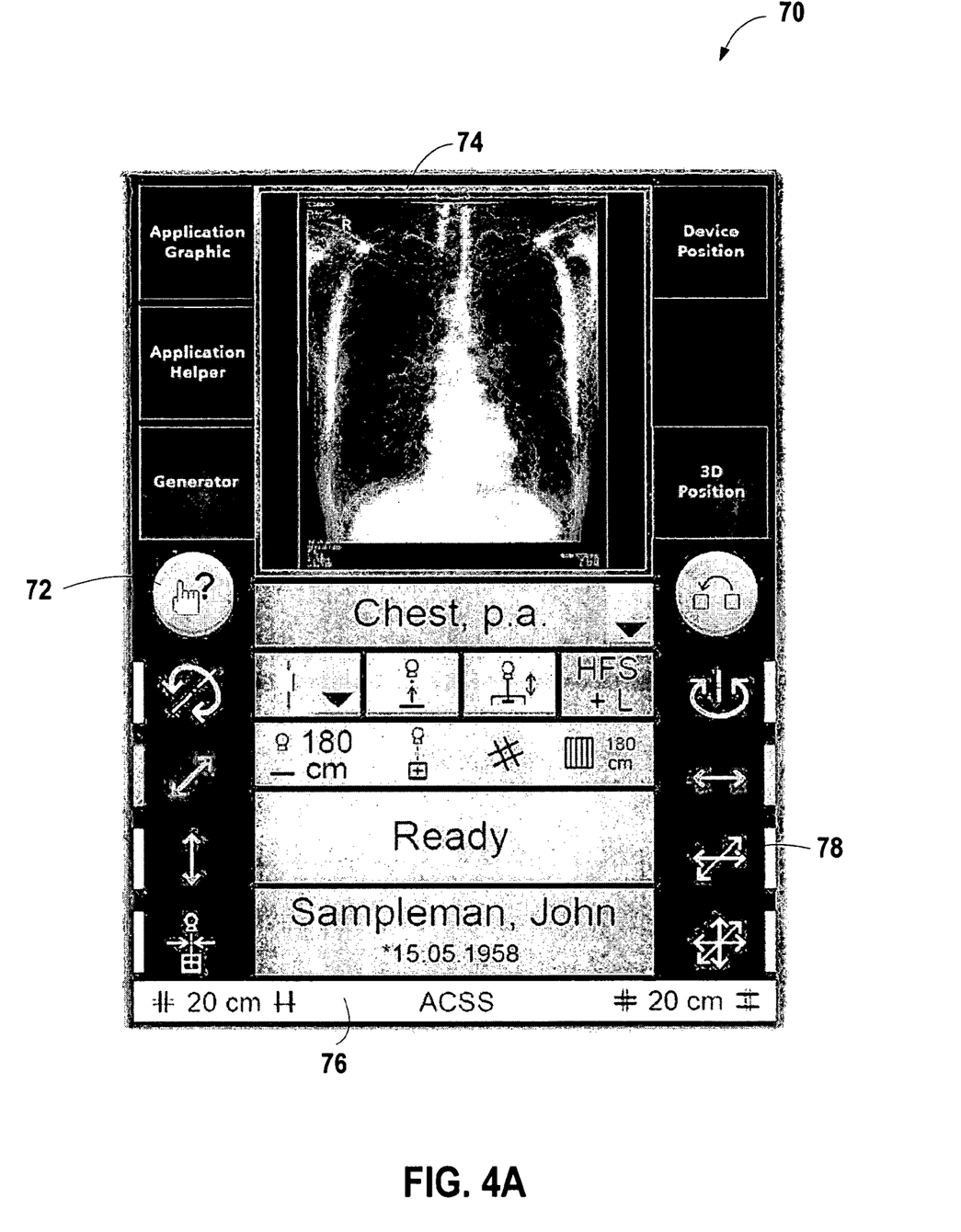
FIGS. 4A-C are exemplary screen shots showing dynamically created user interface elements.
Figure 4B:
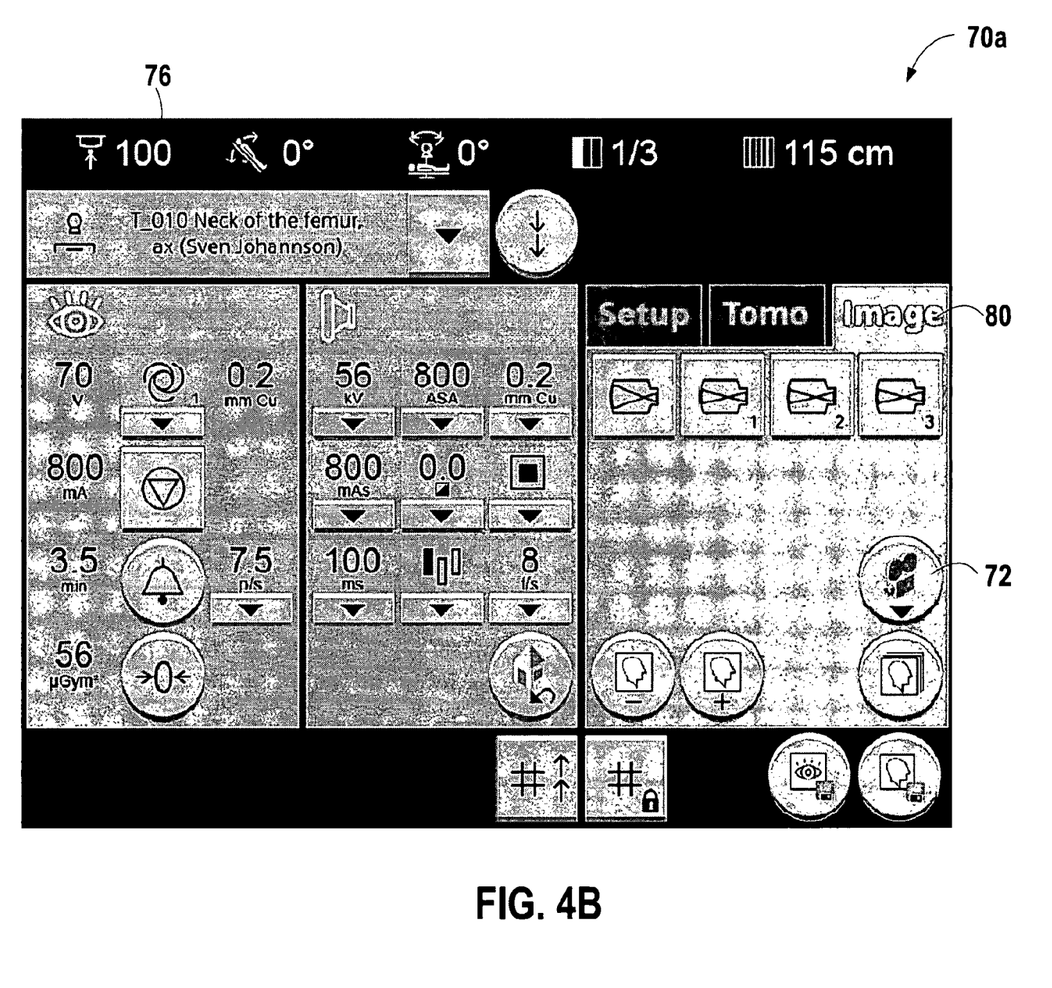
Figure 4C:
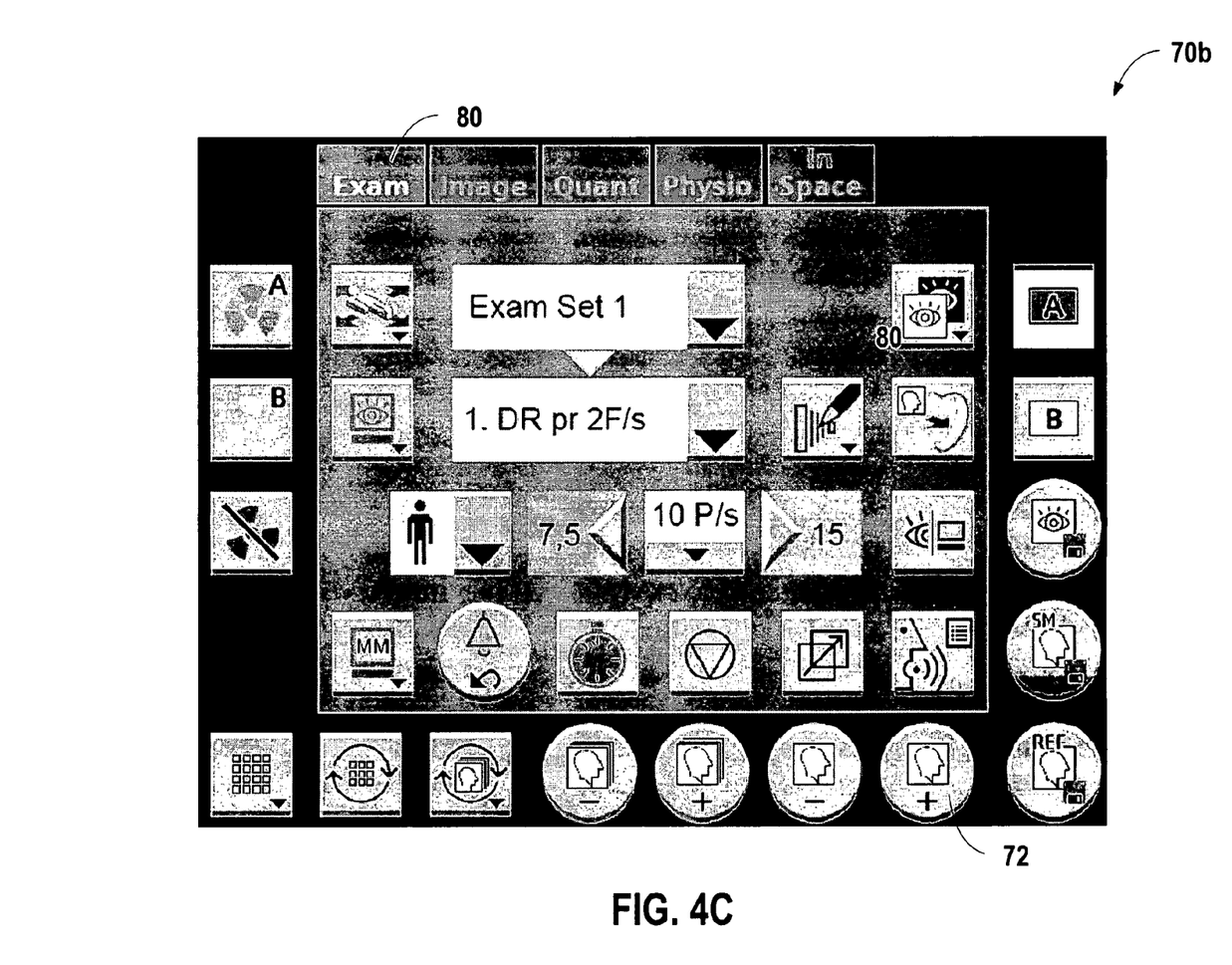

Focusing again on FIG. 3A with references to FIGS. 3B, C, an exemplary interface requires a button 122 (data structure corresponding, e.g., with the user interface button 72 illustrated in FIG. 4A) with specific properties 124 that are of interest for a data set 430, via which button 122 the data set's 430 states can be altered. For example, the button 122 is a button having a width of 100, height of 50, and x, y position coordinates of 30 and 80 respectively, as illustrated in FIG. 3B. Various bitmap images reflect various display states. A unique data ID 126 is provided having a value of "0001" which will serve to bind the button 122 with the communications object(s).

When a communication object with the ObjectID "1232" 202 is received, the data set 430 with dataID "0001" is changed according to the new value of parameter PARAM_A 214 in the "RECEIVE BLOCK" of the com.xml file 200. PARAM_B 214' would be relevant for another graphical object with the data ID "0002" 204'.

When the graphical element with the dataID "0001" 204 is changed internally, accordingly to the "SEND BLOCK" of the com.xml file 200, the specific object associated with the sendobj id "2401" 203 is sent to the system network.

The dataID 204 of the graphical element "0001" is unique to the "what has to be sent" dataID if it internally changes (i.e., is triggered from internal activity), and it is also unique to the "what to do" dataID if the relevant parameter was changed externally (i.e., triggered from the outside).

The application only knows which graphical elements 70-80 are to be generated at the point of time of the reading of the XML file 100 (i.e., at runtime). The Communication Level 40 is likewise defined in the XML file 200 and read at runtime. Using unique IDs 126, 204, data can be changed both internally via the graphical user interface 70 and externally via any type of a communication protocol and be communicated system-wide. Suitable communication mechanisms take on the software-internal communication between the individual layers.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

| | |
|---|---|
| 10 | system |
| 20 | graphical user interface layer |
| 30 | data layer |
| 40 | communication layer |
| 50 | controller |
| 70, 70a, 70b | display, screen or window |
| 72 | graphical element: button |
| 74 | graphical element: image field |
| 76 | graphical element: text field |
| 78 | graphical element: static icon |
| 79 | graphical element: tabcard |
| 80 | external communications |
| 100, 100a, 100b | GUI data file |
| 122 | interface element |
| 124 | interface element properties |
| 126 | data ID |
| 200 | communication data file |
| 202 | communications defined object |
| 204 | data ID |
| 214 | parameter |
| 310 | graphical elements library |
| 320 | data types library |
| 330 | communication library |
| 332 | communication mechanism |
| 340 | main application package |
| 350 | basic library |
| 352 | GUI package |
| 354 | data package |
| 356 | data observer |
| 360 | manager |
| 380 | kernel management library |
| 390 | configuration library |
| 420 | data sets, data set classes |
| 430 | unique data set IDs |
| 440 | error reporting library |

What is claimed is:

1. A method for operating by a user a system having a communications interface and a user interface, the method comprising the steps of:

reading, at run time, a respective front-end graphical user interface (GUI) data file comprising a description of a particular graphical element and a different unique numerical data identifier having a numerical value for identifying the particular graphical element and for being associated with the particular graphical element, said respective front end GUI data file being the only GUI data file which specifies said particular graphical element;

dynamically generating and displaying graphical elements on the user interface based on the associated descriptions from the respective front-end GUI data file associated with each particular graphical element;

receiving and reading, at run time, a back-end communications data file comprising descriptions of communications parameters in the back-end communications data file to create dynamically generated communications parameters and a numerical data identifier having a same common numerical value as the different unique numerical data identifier associated with the particular graphical element for one or more of said communications parameters, said back-end communications data file providing information as to how to manipulate the user interface based on the received and read communication parameters, said communications data file understanding how to work with communications data but not display data for the displayed graphical element of the respective front end GUI data file;

associating the particular graphical element with said one or more communications parameters based on the common numerical value of the respective front-end GUI data file different unique numerical data identifier and the back-end communications data file numerical data identifier; and utilizing the one or more communications parameters associated with the particular graphical element to send data associated with a user interaction of the particular graphical element, and to effect a change in the particular graphical element based on received data.

2. The method according to claim 1, further comprising implementing the communications data file and the respective front-end GUI data file as Extensible Markup Language (XML) files.

3. The method according to claim 1, wherein the graphical elements are selected from the group consisting of windows, popups, tab cards, buttons, text fields, static icons, list boxes, radio groups, and check boxes.

4. The method according to claim 1, further comprising modifying at least one of the respective front-end GUI data file and the back-end communications data file after system software has been compiled and linked to thereby effect a change in the display or respectively communications of the system.

5. The method according to claim 1, wherein the step of utilizing the communications parameter comprises:
  interacting with the particular graphical element by the user in a graphical user interface layer of the system;
  writing data associated with the particular graphical element to a data storage location;
  notifying a controller about new data in a data layer of the system;
  passing the new data, by the controller, to a communications layer of the system;
  transmitting the new data by the communications layer;
  receiving and evaluating incoming data by the communication layer;
  checking the incoming data for changes by the controller;
  writing the incoming data to the data storage location; and
  updating the display in accordance with the incoming data.

6. The method according to claim 1, further comprising segregating software of the system during development time into a portion that is specific for an operating system, and a separate functional libraries portion that is operating system independent.

7. The method according to claim 1, further comprising providing dynamic link libraries comprising string resources and icon resources.

8. The method according to claim 1, further comprising storing system error information in an error log file.

9. The method according to claim 1, further comprising reading a system configuration file, and performing a system configuration and making general settings of the system unrelated to integration with the respective front-end GUI data file.

10. A system for allowing a user to interact with an application, comprising:
  a storage system comprising:
  a respective front-end GUI data file associated with a particular graphical element comprising descriptions of the particular graphical element and a different unique numerical data identifier having a numerical value for identifying the particular graphical element and for being associated with the particular graphical elements, said respective front end data file being the only front-end GUI data file which specifies the particular graphical element; and a back-end communications data file comprising descriptions of communications parameters in the back-end communications data file to create dynamically generated communications parameters and a numerical data identifier having a same common numerical value as the different unique numerical data identifier associated with the particular graphical element for one or more of said communications parameters to be associated with said particular graphical element, said back-end communications data file providing information as to how to manipulate a user interface based on the communications parameters and understanding how to work with communications data but not display data associated with said graphical element of said respective front-end GUI data file;
  the system further comprising:
  the user interface comprising a display upon which graphical elements are presented by a software routine that relate to each of the particular graphical elements read from the respective front-end GUI data file; and
  a communications system comprising:
  an output at which information can be transmitted in accordance with the one or more communications parameters that are related to the particular graphical element via the different unique numerical data identifier with the common numerical value; and
  an input to which information can be transmitted in accordance with the communication parameters that is related to the particular graphical element via the different unique numerical data identifier with the common numerical value.

11. The system according to claim 10, wherein the back-end communications data file and the respective front-end GUI data file are Extensible Markup Language (XML) files.

12. The system according to claim 10, wherein the graphical elements are selected from the group consisting of windows, popups, tabcards, buttons, text fields, static icons, list boxes, radio groups, and check boxes.

13. The system method according to claim 10, further comprising program that modifies at least one of the respective front-end GUI data file and the back-end communications data file after system software has been compiled and linked to thereby effect a change in the display or respectively communications of the system.

14. The system according to claim 10, further comprising:
  a further storage system into which new data associated with a user interaction of a graphical element is placed, and into which incoming external data is placed; and
  a controller that is notified about the new data placed in the further storage system and that transmits the new data to the communications layer of the system via an interface, and that transmits the incoming external data to the user interface.

15. The system according to claim 10, wherein software of the system comprises a portion that is specific for an operating system, and a separate functional libraries portion that is operating system independent.

16. The system according to claim 10, further comprising:
  a dynamic link library comprising string resources; and
  a dynamic link library comprising icon resources.

17. The system according to claim 10, further comprising an error log file containing system error information.

18. The system according to claim 10, further comprising a stem configuration file that is utilized for configuring the system and to make general settings of the system unrelated to integration with the respective front-end GUI data file.

* * * * *